US011939149B2

(12) United States Patent
Rosati et al.

(10) Patent No.: US 11,939,149 B2
(45) Date of Patent: Mar. 26, 2024

(54) INDUSTRIAL CONTAINER WITH PIVOTABLE RAMP WALL

(71) Applicant: Cooper Tank LLC, Brooklyn, NY (US)

(72) Inventors: Domenico Rosati, Brooklyn, NY (US); Tonino Rosati, Brooklyn, NY (US); Mariano Tucciarone, Brooklyn, NY (US)

(73) Assignee: COOPER TANK LLC, Brooklyn, NY (US)

( * ) Notice: Subject to any disclaimer, the term of this patent is extended or adjusted under 35 U.S.C. 154(b) by 230 days.

(21) Appl. No.: 17/466,283

(22) Filed: Sep. 3, 2021

(65) Prior Publication Data

US 2022/0063902 A1 Mar. 3, 2022

Related U.S. Application Data

(60) Provisional application No. 63/074,431, filed on Sep. 3, 2020.

(51) Int. Cl.
*B65D 88/54* (2006.01)
*E05C 9/02* (2006.01)
*E05C 9/10* (2006.01)

(52) U.S. Cl.
CPC .............. *B65D 88/542* (2013.01); *E05C 9/02* (2013.01); *E05C 9/10* (2013.01)

(58) Field of Classification Search
CPC .............. B65D 88/542; B65D 90/0086; B65D 88/124; E05C 9/02; E05C 9/10; E05C 9/12; E05C 9/14
USPC .................................................. 220/1.5, 478
See application file for complete search history.

(56) References Cited

U.S. PATENT DOCUMENTS

| | | | | |
|---|---|---|---|---|
| 5,624,049 A * | 4/1997 | Kovash | B65D 88/128 | 220/650 |
| 8,840,354 B2 * | 9/2014 | Melancon, Jr. | B65D 88/123 | 414/537 |
| 9,067,524 B2 | 6/2015 | Melancon, Jr. | | |
| 9,545,867 B2 | 1/2017 | Melancon, Jr. | | |
| 9,884,575 B2 | 2/2018 | Melancon, Jr. et al. | | |
| 10,252,855 B1 * | 4/2019 | Melancon, Jr. | B65D 88/542 | |
| 2004/0056029 A1 * | 3/2004 | Petzitillo | B62D 25/12 | 220/1.5 |
| 2017/0341559 A1 * | 11/2017 | Melancon, Jr. | B65D 88/123 | |

* cited by examiner

*Primary Examiner* — Rafael A Ortiz
(74) *Attorney, Agent, or Firm* — Hodgson Russ LLP

(57) ABSTRACT

The present disclosure provides an industrial container and a method of opening an industrial container. The industrial container includes a container body, a pivot assembly, a counter-balancing spring assembly, and a locking assembly. The container body can have a plurality of walls, the plurality of walls including a pivotable ramp wall. The pivot assembly can connect the ramp wall with the container body for pivotal movement of the ramp wall, and the pivot assembly can include a pivot shaft supported by a pair of arms. The counter-balancing spring assembly can include one or more springs arranged about the pivot shaft for biasing the ramp wall from a downwardly inclined loading position upwardly toward a vertical closed position with a torque force. The locking assembly can be configured to lock the ramp wall in the vertical closed position.

20 Claims, 5 Drawing Sheets

INDUSTRIAL CONTAINER WITH PIVOTABLE RAMP WALL

CROSS-REFERENCE TO RELATED APPLICATION

This application claims priority to U.S. Application No. 63/074,431, filed Sep. 3, 2020, the entire disclosure of which is hereby incorporated by reference.

FIELD OF THE DISCLOSURE

The present invention relates generally to industrial containers, including containers for transporting and storing landscaping materials or waste.

BACKGROUND OF THE DISCLOSURE

Industrial containers are used for a range of purposes, including hauling trash, work materials, debris, or any other material with a mass that requires a loadbearing, rigid structure. The materials that are typically placed in these containers can be heavy and difficult to manage, often times requiring the use of heavy-duty industrial equipment to load and unload them. To facilitate loading in unloading of materials from such containers, certain containers can include a loadbearing ramp wall. The loadbearing ramp wall may be used to support the weight of industrial equipment, such as a backhoe, truck, or the like. In other words, the ramp wall can both enclose the industrial container (e.g. as a side or back wall), and serve as a ramp for heavy-duty industrial equipment (e.g. to allow the equipment to approach and/or enter the container).

Prior art industrial containers having a loadbearing ramp wall may also have counterbalancing springs and/or hydraulic motors to assist opening and closing of the ramp by a user. However, such containers are difficult and expensive to manufacture, and can present safety issues for users. For example, prior art industrial containers may include separate locking mechanisms on each side, where each needs to be separately operated in order to lower the ramp wall. This may present problems for a single user to operate both locking mechanisms. In addition, the user may at risk of injury when lowering the ramp wall due to its weight. An improved industrial container having a loadbearing ramp is therefore needed.

BRIEF SUMMARY OF THE DISCLOSURE

An embodiment of the present disclosure provides an industrial container. The industrial container may comprise a container body, a pivot assembly, a counter-balancing spring assembly, and a locking assembly. The container body may include a plurality of walls including a ramp wall. The pivot assembly may connect the ramp wall with the container body for pivotal movement of the ramp wall. The pivot assembly may include a pivot shaft. The counter-balancing spring assembly may include one or more springs arranged about the pivot shaft for biasing the ramp wall from a downwardly inclined loading position upwardly toward a vertical closed position with a torque force. The locking assembly may be configured to lock the ramp wall in the vertical closed position.

According to embodiments of the present disclosure, the counter-balancing spring assembly may comprise two torsion springs arranged concentrically about the pivot shaft. The two torsion springs may each include tangentially outwardly extending end portions which engage downwardly with a bottom wall of the container body and upwardly with the ramp wall. The two torsion springs may have a combined torque that is between 80% and 100% of the gravitational torque force generated by the weight of the ramp wall.

According to embodiments of the present disclosure, the pivot shaft may extend from one side edge of the ramp wall, through a bottom portion of the ramp wall, and through an opposite side edge of the ramp wall.

According to embodiments of the present disclosure, the container body may further comprises a hook extending upwardly from a bottom wall of container body. The hook may be disposed at a height lower than the ramp wall, such that the hook does not interfere with the ramp wall in the loading position. The hook may be retractable from a raised position to a concealed position, such that the hook does not interfere with the ramp wall in the loading position when the hook is in the concealed position.

According to embodiments of the present disclosure, side walls of the container body may include protruding upper portions extending outwardly from ends of the side walls which abut with the ramp wall in the inclined position. The protruding upper portions may be angled or curved relative to the ends of the side walls. A side profile of the protruding upper portions may correspond to a side profile of the ramp wall.

According to embodiments of the present disclosure, the locking assembly may comprise an arm, a first link, one or more first locking latches, and a second link. The arm may be pivotably connected to a first side wall of the container body. The first link may be pivotably connected to the arm. The one or more first locking latches may pivotably connected to the first side wall and pivotably connect to the first link. The one or more first locking latches may selectively engage with the ramp wall to lock the ramp wall in the inclined position. The second link may pivotably connected to the first link. Rotation of the arm from a lower position to an upper position may cause rotation of the one or more first locking latches to disengage with the ramp wall and unlock the ramp wall from the inclined position.

According to embodiments of the present disclosure, the locking assembly may further comprise a locking shaft, a third link, a fourth link, and one or more second locking latches. The locking shaft may extend from the first side wall to a second side wall opposite to the first side wall. The locking shaft may be pivotably connected to the second link at a first end adjacent to the first side wall. The third link may be pivotably connected to the locking shaft at a second end adjacent to the second side wall. The fourth link may be pivotably connected to the third link. The one or more second locking latches may be pivotably connected to the second side wall and pivotably connected to the fourth link. The one or more second locking latches may selectively engage with the ramp wall to lock the ramp wall in the inclined position. Rotation of the arm from the lower position to the upper position may further cause rotation of the second link, locking shaft, third link, and one or more second locking latches to disengage with the ramp wall and unlock the ramp wall from the inclined position.

According to embodiments of the present disclosure, the locking assembly may further comprise an arm lock connected to the first side wall and selectively connected to the arm which locks the arm in the lower position.

According to embodiments of the present disclosure, the locking assembly may further comprise a safety latch pivotably connected to the first side wall which selectively engages with the ramp wall to lock the ramp wall in the inclined position.

An embodiment of the present disclosure provides a method of opening an industrial container. The method may comprise rotating an arm from a lower position to an upper position, and lowering a ramp wall from a vertical closed position to an inclined loading position.

According to embodiments of the present disclosure, before rotating the arm from the lowered position to the upper position, the method may further comprise disconnecting an arm lock from the arm. The arm lock may be connected to the first side wall and may be selectively connected to the arm to secure the arm in the lower position and the upper position.

According to embodiments of the present disclosure, before lowering the ramp wall from the vertical closed position to the inclined loading position, the method may further comprise rotating a safety latch from a locked position to an unlocked position. The safety latch may be pivotably connected to the first side wall and may selectively engage with the ramp wall to lock the ramp wall in the inclined position.

According to embodiments of the present disclosure, the method may further comprise closing the industrial container by raising the ramp wall from the inclined loading position to the vertical closed position, and rotating the arm from the upper position to the lower position. Rotation of the arm from the upper position to the lower position may cause rotation of the one or more first locking latches to engage with the ramp wall and lock the ramp wall in the inclined position.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
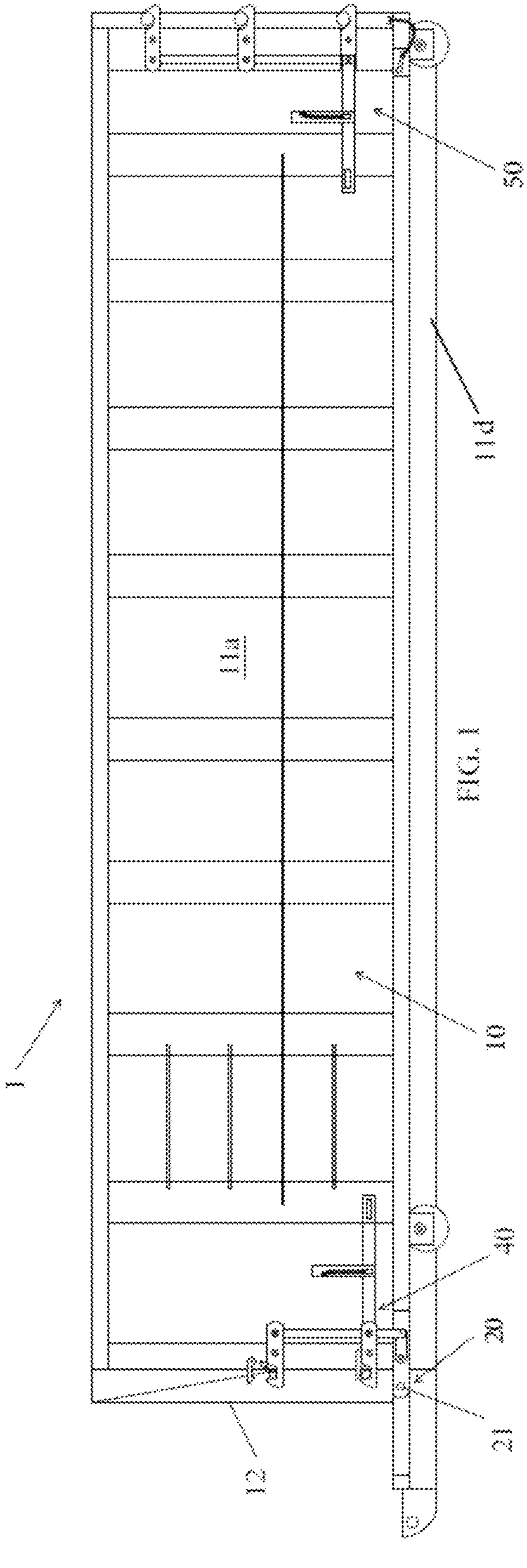
FIG. 1 is a right side elevation view of an industrial container according to an embodiment of the present disclosure.
Figure 3:
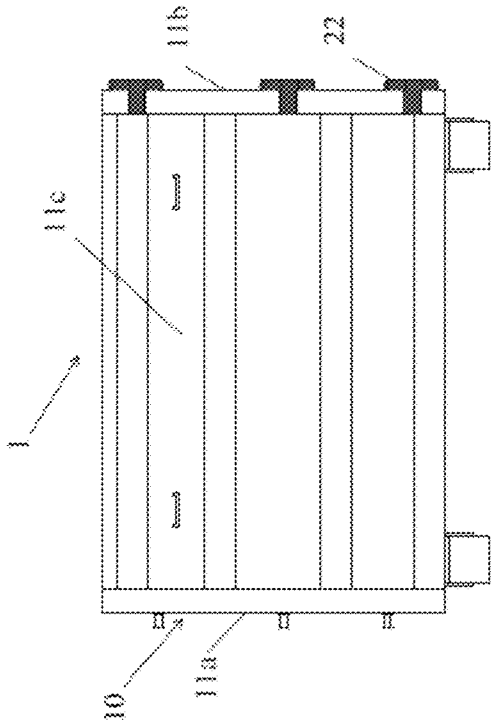
FIG. 3 is a rear elevation view of an industrial container of the present disclosure.
Figure 2:
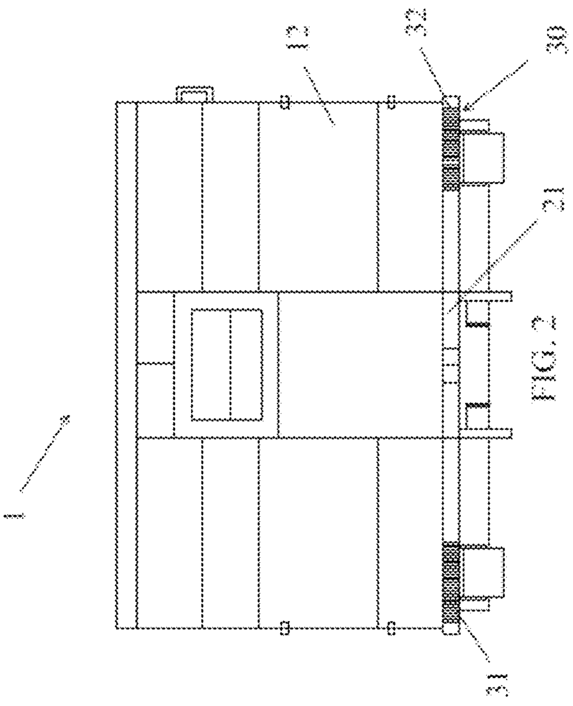
FIG. 2 is a front elevation view of an industrial container of the present disclosure.

Referring to FIGS. 1-3, the present disclosure provides an industrial container 1. The industrial container 1 may comprise a container body 10, a pivot assembly 20, a counter-balancing spring assembly 30, and a locking assembly 40. The container body 10 can have a plurality of walls. The plurality of walls may include a first side wall 11*a*, a second side wall 11*b*, a rear wall 11*c*, a bottom wall 11*d*, and a pivotable ramp wall 12. The first side wall 11*a* and the second side wall 11*b* may extend upwardly from the bottom wall 11*d* on opposite sides of the container body 10. The first side wall 11*a* and the second side wall 11*b* may be fixedly connected to the bottom wall 11*d*, or the first side wall 11*a* and the second side wall 11*b* may be integrally formed with the bottom wall 11*d*. The rear wall 11*c* may be pivotably connected to the first side wall 11*a* or the second side wall 11*b*. For example, the rear wall 11*c* may be pivotably connected to the second side wall 11*b* by one or more hinges 22, as shown in FIG. 3.

The ramp wall 12 may be pivotably connected to container body 10. For example, the ramp wall 12 may be pivotably connected to the first side wall 11*a* and the second side wall 11*b*, or the ramp wall 12 may be pivotably connected to the bottom wall 11*d*. The pivot assembly 20 can connect the ramp wall 12 with the container body 10 for pivotal movement of the ramp wall 12 about one or more pivot shafts 21. As shown in FIG. 2, the pivot shaft 21 may extend from one side edge of the ramp wall 12, through a bottom portion of the ramp wall 12, and through an opposite side edge of the ramp wall 12. The container body 10 can include arms 14*a*, 14*b* that receive the ends of pivot shaft 21. For example a first arm 14*a* may extend from a lower portion of the first side wall 11*a*, and a second arm 14*b* may extend from a lower portion of the second side wall 11*b*. Alternatively, the first arm 14*a* and the second arm 14*b* may extend from the bottom wall 11*d*. The first arm 14*a* and the second arm 14*b* may include apertures, through which the pivot shaft 21 is rotatably received.

The counter-balancing spring assembly 30 can include one or more springs 31, 32 arranged about the one or more pivot shafts 21 for biasing the ramp wall 12 from a downwardly inclined loading position upwardly toward a vertical closed position (e.g. as shown in FIGS. 1-2) with a torque force.

Figure 4A:
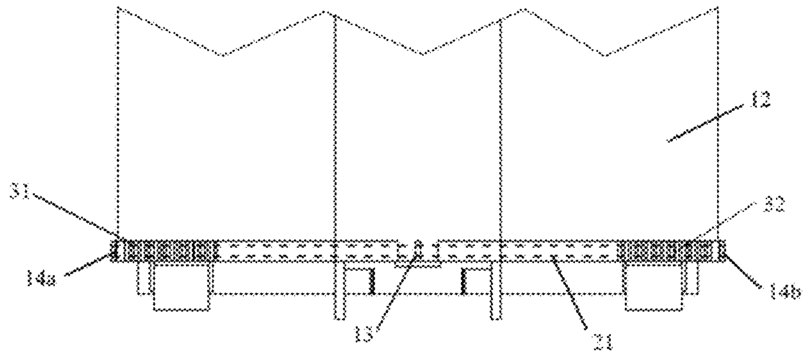
FIG. 4A is a detail front elevation view of an industrial container of the present disclosure.

FIG. 4A is a detail front view of an industrial container 1 according to an embodiment of the present disclosure. In one specific embodiment, the counter-balancing spring assembly 30 can include two counter balancing torsion springs 31, 32 arranged concentrically about a single, horizontal pivot shaft 21. The pivot shaft 21 can extend from one ramp wall 12 side edge, through a bottom portion of the ramp wall, and through the opposite side edge of the ramp wall. However, it is also contemplated that there may be more than one pivot shaft 21, for example, that extend partially through the ramp wall 12. It is also contemplated that the one or more pivot shafts 21 could be located below the ramp wall 12, and that the ramp wall 12 can include extensions that receive the one or more pivot shafts 21. It can be appreciated that the placement of the pivot shaft 21 and the torsion springs 31, 32 may provide greater protection to the users than the prior art in the case of spring failure.

Each torsion spring 31, 32, can include tangentially outwardly extending end portions that engage downwardly with a bottom wall of the container body 10 and upwardly with the ramp wall 12, respectively. The torsion springs 31, 32 can have a torque force that is generally equal to the gravitational torque force generated by the weight of the ramp wall 12 when it is connected with at least one container wall. As an example, the torsion springs 31, 32 can have a torque that is approximately 90% (e.g. +/−10% or +/−5%) of the gravitational torque force generated by the weight of the ramp wall 12. It is also conceivable that other types of spring arrangements, such as tension and/or compression spring arrangements, could be used to counter-balance the weight of the ramp wall. The pivot shaft 21 about which the springs 31, 32 are arranged extend outwardly from the ramp wall bottom side edges for connection with the container body 10. As one example, the container body can include arms 14*a*, 14*b* that receive the pivot shaft 21.

The container body 10 may also include a hook 13 that allows for towing cables of a flatbed truck to load and unload the industrial container 1. The hook 13 may extend upwardly from the bottom wall 11*d* of the container body 10. For example, the hook 13 may include a hook member 13*a* extending upwardly from a hook plate 13*b*. The hook 13 may be disposed within a receiving part 13*c* of the bottom wall 11*d*. For example, the hook plate 13*b* may be secured to the receiving part 13*c*.

Figure 4B:
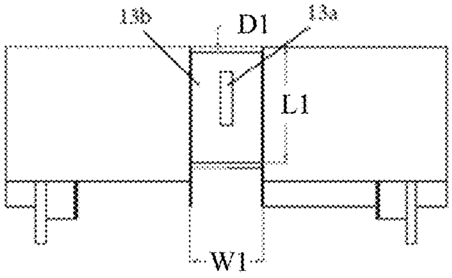
FIG. 4B is a detail top view of a prior art hook according to a prior art industrial container.

In order to allow for the ramp wall 12 to be positioned in its inclined loading position and not strike the hook 13, the hook 13 may be positioned lower than that of a standard container. FIGS. 4B and 4D depict the location and structure of a hook on a standard container. As shown in FIG. 4B, the receiving part 13*c* of a standard container may have a width W1 of about 6 inches, and the hook plate 13*b* may have a length L1 of about 16 inches. The hook plate 13*b* may be disposed at a depth D1 of about 1 inch or less from an upper surface of the bottom wall 11*d*. In this way, the hook member 13*a* may extend upwardly above the upper surface of the bottom wall 11*d*, and may interfere with the ramp wall 12 when in the loading position.

Figure 4C:
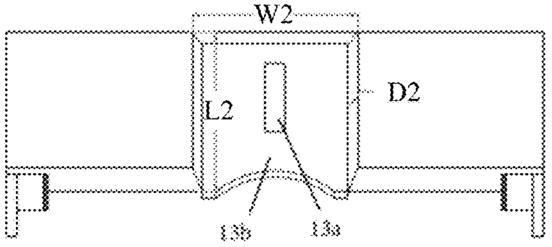
FIG. 4C is a detail top view of a hook of an industrial container of the present disclosure.
Figure 4D:
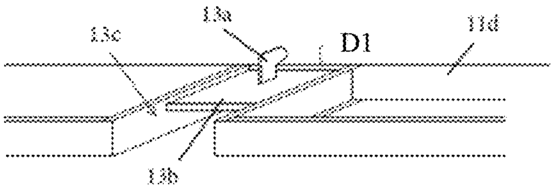
FIG. 4D is a detail perspective view of a prior art hook according to a prior art industrial container.
Figure 4E:
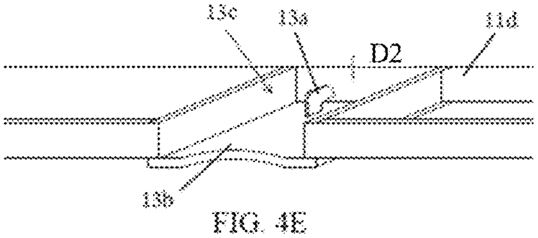
FIG. 4E is a detail perspective view of a hook of an industrial container of the present disclosure.

In comparison, FIGS. 4C and 4E show an embodiment according to the present application, where the hook 13 is three inches lower than a hook on a standard container. For example, the receiving part 13*c* may have a width W2 of about 12 inches and the hook plate 13*b* may have a length L2 of about 18 inches. The hook plate 13*b* may be disposed at a depth D2 of about 3 inches or more from an upper surface of the bottom wall 11*d*. For example, the hook plate 13*b* may be disposed on a lower surface of the bottom wall 11*d*. In this way, the hook member 13*a* may not extend upwardly above the upper surface of the bottom wall 11*d*, and the hook 13 does not interfere with the ramp wall 12 when in the loading position. The receiving part 13*c* of the bottom wall 11*d* may also be larger than that of a standard container for ease of attachment of cables and other towing members to the hook 13.

Although not shown in the figures, it is also contemplated that the hook 13 may be retractable. For example, the hook 13 could pivot from a raised position to a concealed position. In the raised position, the hook member 13*a* may extend upwardly from the bottom wall 11*d* to be engaged with towing cables. In the concealed position, the hook member

13*a* may be retracted, such that it does not interfere with the displacement of the ramp wall 12 in its inclined loading position.

Figure 6:
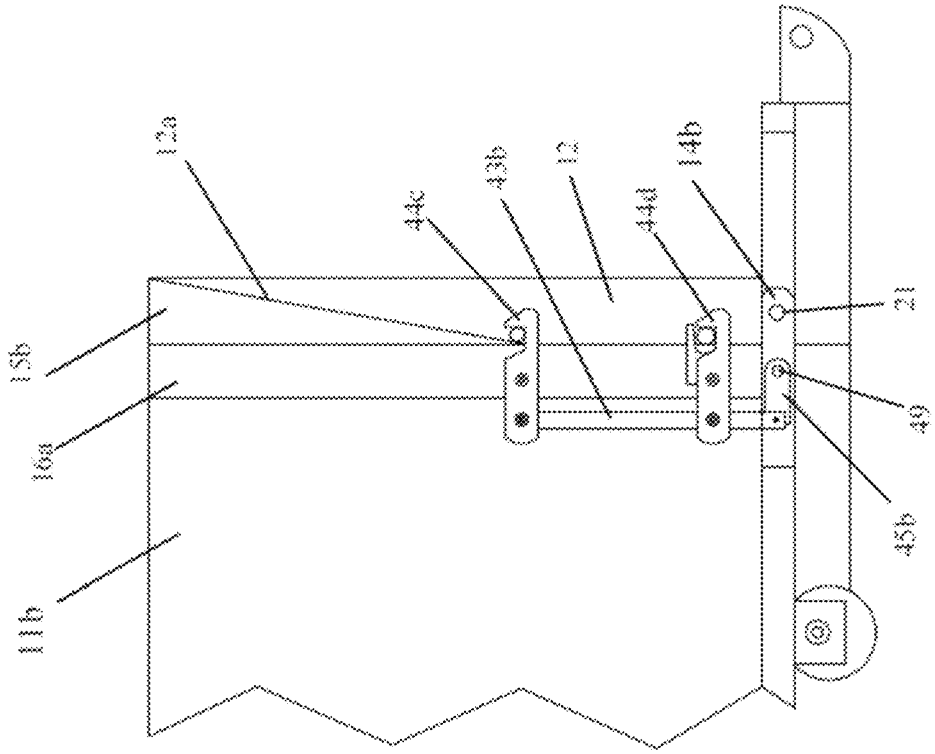
FIG. 6 is a rear elevation view of an industrial container of the present disclosure.
Figure 5:
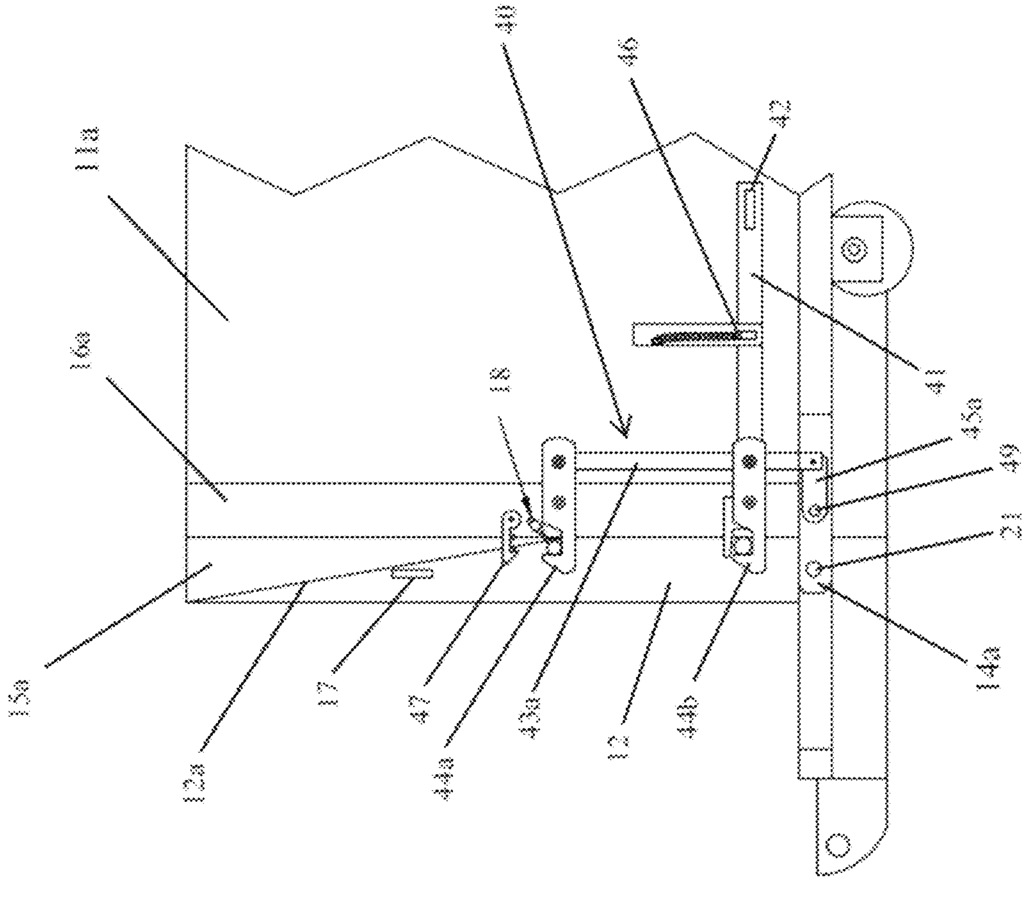
FIG. 5 is a front elevation view of an industrial container of the present disclosure.

FIGS. 5 and 6 are detail side views of an industrial container 1 according to an embodiment of the present disclosure. The side walls 11*a*, 11*b* of the container body 10 can include protruding upper portions 15*a*, 15*b* that extends beyond a liner end wall (e.g. vertical supports 16*a*, 16*b*). The protruding upper portions 15*a*, 15*b* can be integrally formed with the first and second side walls 11*a*, 11*b*, or be affixed during manufacturing of the container body 10 (e.g. via welding). In the depicted example, the protruding upper portions 15*a*, 15*b* are linear angled walls, but curved walls could alternatively be used. The ramp wall 12 can have a corresponding shape so that the container body 10 can receive the ramp wall 12. For example, the ramp wall 12 can have an angled wall 12*a* that corresponds in shape with the protruding upper portions 15*a*, 15*b* such that the angled wall 12*a* abuts the protruding upper portions 15*a*, 15*b* when the ramp wall 12 is located in the vertical closed position. The ramp wall 12 can also include a handle 17 for allowing a user to lift the ramp wall 12 from its downwardly inclined loading position toward the vertical closed position, while located at a side of the industrial container 1. One or more soft close mechanisms 18, such as a damper, piston, or spring, can be provided on one or more side walls 11*a*, 11*b* of the container body 10 to manipulate the closing motion of the ramp wall 12 (e.g. at a controlled rate) so that the ramp wall 12, regardless of how much force is used to begin the closing motion, will softly close without slamming into the container body 10.

According to embodiments of the present disclosure, the industrial container 1 can include a locking assembly 40. The locking assembly 40 can be configured to lock the ramp wall 12 in the vertical closed position. With reference to FIG. 5, the locking assembly 40 can include an arm 41 having a handle 42 that is pivotably connected to the container body 10. For example, the arm 41 may be pivotably connected to the first side wall 11*a*. The arm 41 can be connected to a first link 43*a*. The first link 43*a* may be pivotably connected to one or more first locking latches 44*a*, 44*b* and pivotably connected to the first side wall 11*a*. The one or more first locking latches 44*a*, 44*b* may selectively engage with the ramp wall 12 to lock the ramp wall 12 in the inclined position. The first link 43*a* may also be pivotably connected to a second link 45*a*. An arm lock 46, such as a locking pin, can be provided to lock the arm 41 in its lower, closed position. The locking assembly 40 may also include a safety latch 47 for locking the ramp wall 12 relative to the container body 10.

According to embodiments of the present disclosure, the industrial container 1 may also include a rear locking assembly 50 configured to lock the rear wall 11*c*. As shown in FIG. 1, the rear locking assembly 50 may include similar structure and operation to the locking assembly 40, the details of which are not repeated herein. It can be appreciated that the locking assembly 40 and the rear locking assembly 50 may be provided on the same side of the industrial container 1, for ease of operation by a single user to open the rear wall 11*c* or lower the ramp wall 12.

With reference to FIG. 6, the opposite side of the industrial container 1 can also include a third link 43*b*, fourth link 45*b*, and second locking latches 44*c*, 44*d*. The first link 43*a* can be pivotably connected to a second link 45*b*. The third link 45*b* can be connected to the second link 45*a* via a locking shaft 49. The locking shaft may extend from the first side wall 11*a* to the second side wall 11*b*. Rotation of the arm 41 from its lower, closed position upwardly towards an open position, can urge the first link 43*a* upwardly thereby rotating first locking latches 44*a*, 44*b* from a locked position to an unlocked position. Rotation of the arm 41 from its lower, closed position upwardly towards an open position, can similarly rotate the second link 45*a*, thereby causing rotating of the locking shaft 49. Rotation of the locking shaft 49 can cause rotation of the fourth link 45*b* on the opposite side of the container body 10 to urge the third link 43*b* upwardly, thereby rotating second locking latches 44*c*, 44*d* from a locked position to an unlocked position. As will be understood, rotating the arm 41 downwardly from its open position to its lower, closed position can cause the opposite to occur for locking the ramp wall 12 relative to the container body 10.

In the depicted embodiment, FIG. 6 does not include all of the same features of the locking assembly 40 provided in FIG. 5. Such an arrangement can be useful for allowing a single operator to safely open and close the ramp wall 12. However, the present disclosure should not be read to be limiting in this regard, and it is contemplated that one or more of these features could also be located on the opposite side of the container (e.g. the left side or passenger's side of the container), or that one or more of the above-described features could be symmetrically located on both sides of the container.

An embodiment of the present disclosure provides a method 200 of opening an industrial container. The method 200 may be applied to the industrial container 1 of embodiments of the present disclosure. The industrial container may comprise a container body, a pivot assembly, a counter-balancing spring assembly, and a locking assembly. The container body may have a plurality of walls. The plurality of walls may include a ramp wall. The pivot assembly may connect the ramp wall with the container body for pivotal movement of the ramp wall. The pivot assembly may include a pivot shaft supported by a pair of arms. The counter-balancing spring assembly may include one or more springs arranged about the pivot shaft for biasing the ramp wall from a downwardly inclined loading position upwardly toward a vertical closed position with a torque force. The locking assembly may be configured to lock the ramp wall in the vertical closed position. The locking assembly may include an arm, a first link, and one or more first locking latches. The arm may be pivotably connected to a first side wall of the container body. The first link may be pivotably connected to the arm. The one or more first locking latches may be pivotably connected to the first side wall and pivotably connected to the first link, and may selectively engage with the ramp wall to lock the ramp wall in the inclined position.

Figure 7:
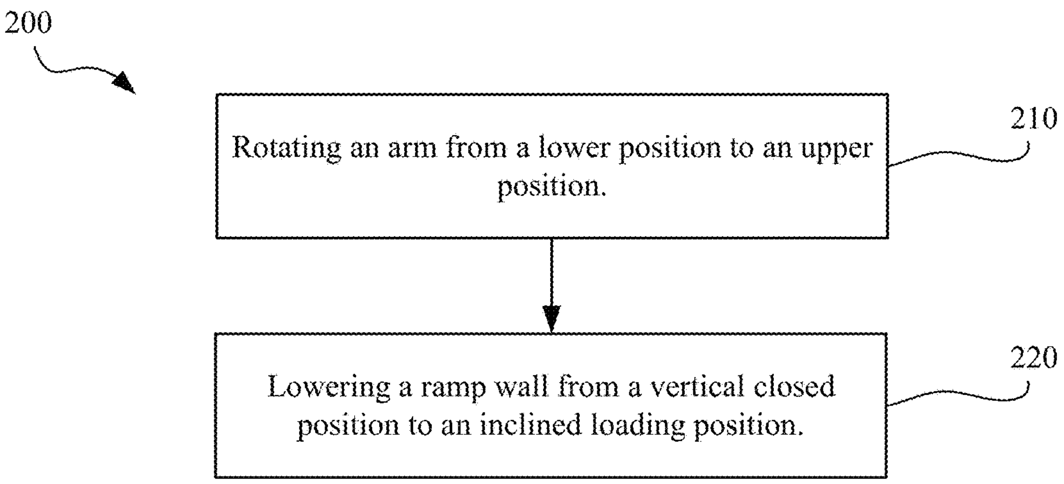
FIG. 7 is a flow chart of a method of opening an industrial container according to an embodiment of the present disclosure.

Photographs illustrating the method 200 are disclosed in U.S. Application No. 63/074,431, the entirety of which is incorporated by reference herein. As shown in FIG. 7, the method 200 may include the following steps. At step 210, the arm is rotated from a lower position to an upper position. A user may lift the arm via a handle. At step 220, the ramp wall is lowered from the vertical closed position to the inclined loading position. A user may lower the ramp wall via a ramp handle disposed on a side of the ramp wall.

According to the method 200 of the present disclosure, rotation of the arm from the lower position to the upper position may cause rotation of the one or more first locking latches to disengage with the ramp wall and unlock the ramp wall from the inclined position. In this way, the user may simply and safely open the industrial container by lowering the ramp wall to load/unload contents of the industrial container.

Figure 8:
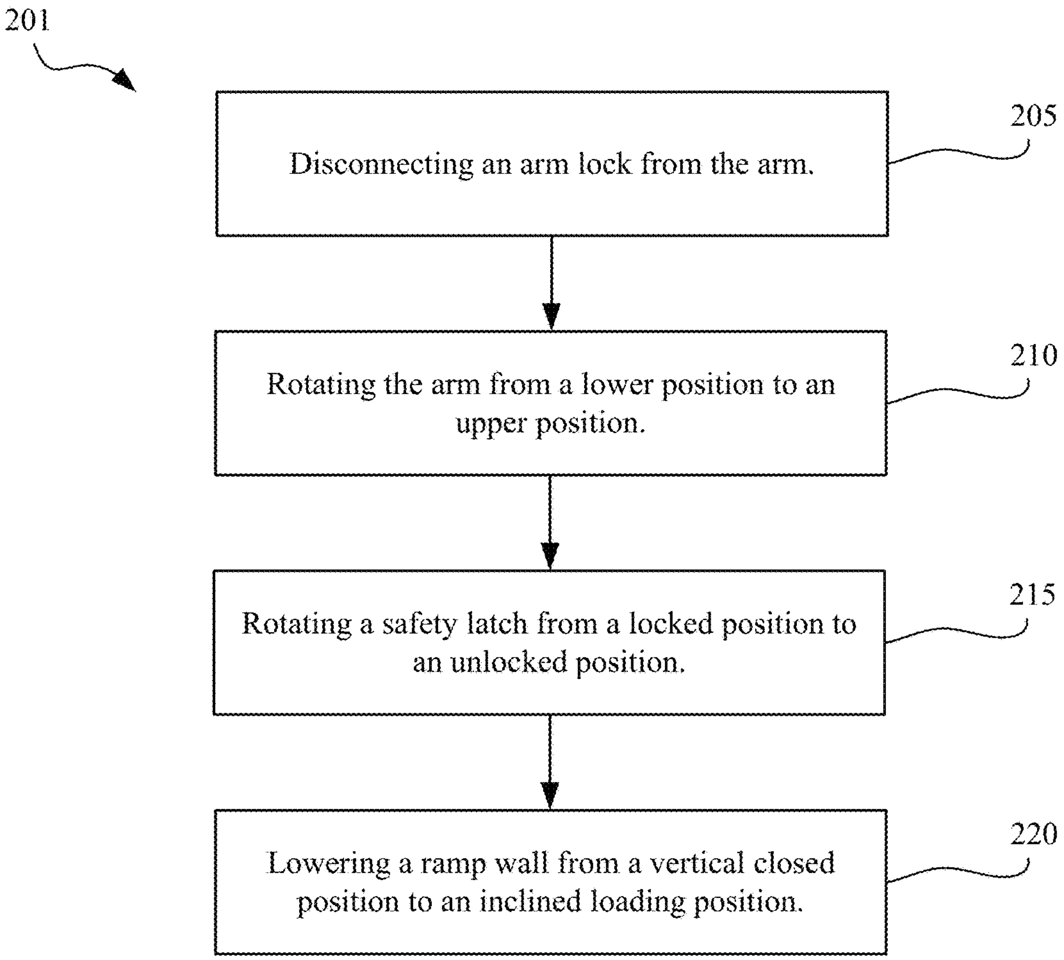
FIG. 8 is a flow chart of a method of opening an industrial container according to another embodiment of the present disclosure.

An embodiment of the present disclosure provides another method 201 of opening an industrial container. As shown in FIG. 8, the method 201 may differ from the method 200 in that the method 201 may comprise the following additional steps.

At step 205, an arm lock is disconnected from the arm. Step 205 may be performed before step 210. The arm lock may be reconnected to the arm after step 210 to fix the arm in the upper position. The arm lock may be connected to the first side wall and may be selectively connected to the arm to secure the arm in the lower position and the upper position. For example, the arm lock may be a pin connected to the first side wall by a chain. The pin may be inserted in a corresponding hole of the arm. When the pin is inserted into the hole, the arm may be fixed in the lower position or the upper position, and unable to rotate. The user may disconnect the arm lock from the arm by removing the pin from the hole. The arm lock may prevent accidental rotation of the arm, which may result in accidental opening of the industrial container.

At step 215, a safety latch may be rotated from a locked position to an unlocked position. Step 215 may be performed before step 220. The safety latch may be pivotably connected to the first side wall and may selectively engage with the ramp wall to lock the ramp wall in the inclined position. For example, the safety latch may be a rotatable pawl pivotably connected to the first side wall. When the safety latch in is in the locked position, the pawl may engage with the ramp wall to prevent rotation of the ramp wall. When the safety latch is in the unlocked position, the pawl may be positioned away from the ramp wall, such that the ramp wall may be free to rotate. The safety latch may further prevent accidental rotation of the ramp wall when the ramp wall is disengaged from the one or more first locking latches, which may result in accidental opening of the industrial container.

With the method 201 of the present disclosure, the arm lock and the safety latch may provide additional safety measures to the opening of the industrial container such that a single user can safely and easily lower the ramp wall with reduced risk of injury from accidental opening.

Figure 9:
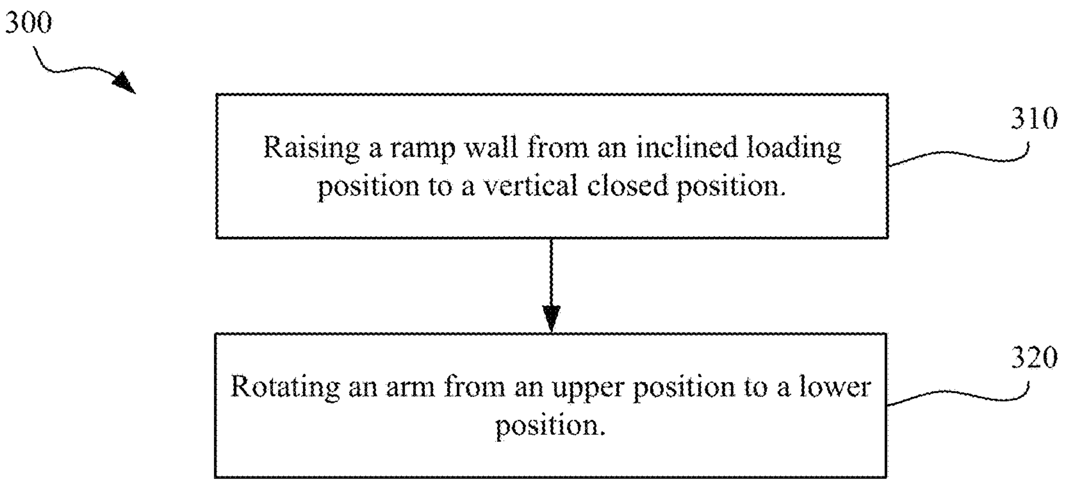
FIG. 9 is a flow chart of a method of closing an industrial container according to an embodiment of the present disclosure.

An embodiment of the present disclosure provides a method 300 of closing an industrial container. The method 300 may be performed following the method 200 of opening the industrial container. As shown in FIG. 9, the method 300 may include the following steps. At step 310, the ramp wall is raised from the inclined loading position to the vertical closed position. A user may raise the ramp wall via a ramp handle disposed on a side of the ramp wall. At step 320, the arm is rotated from the upper position to the lower position. A user may rotate the arm via a handle.

According to the method 300 of the present disclosure, rotation of the arm from the upper position to the lower position may cause rotation of the one or more first locking latches to engage with the ramp wall and lock the ramp wall in the inclined position. In this way, the user may simply and safely close the industrial container by raise the ramp wall to secure contents in the industrial container.

Figure 10:
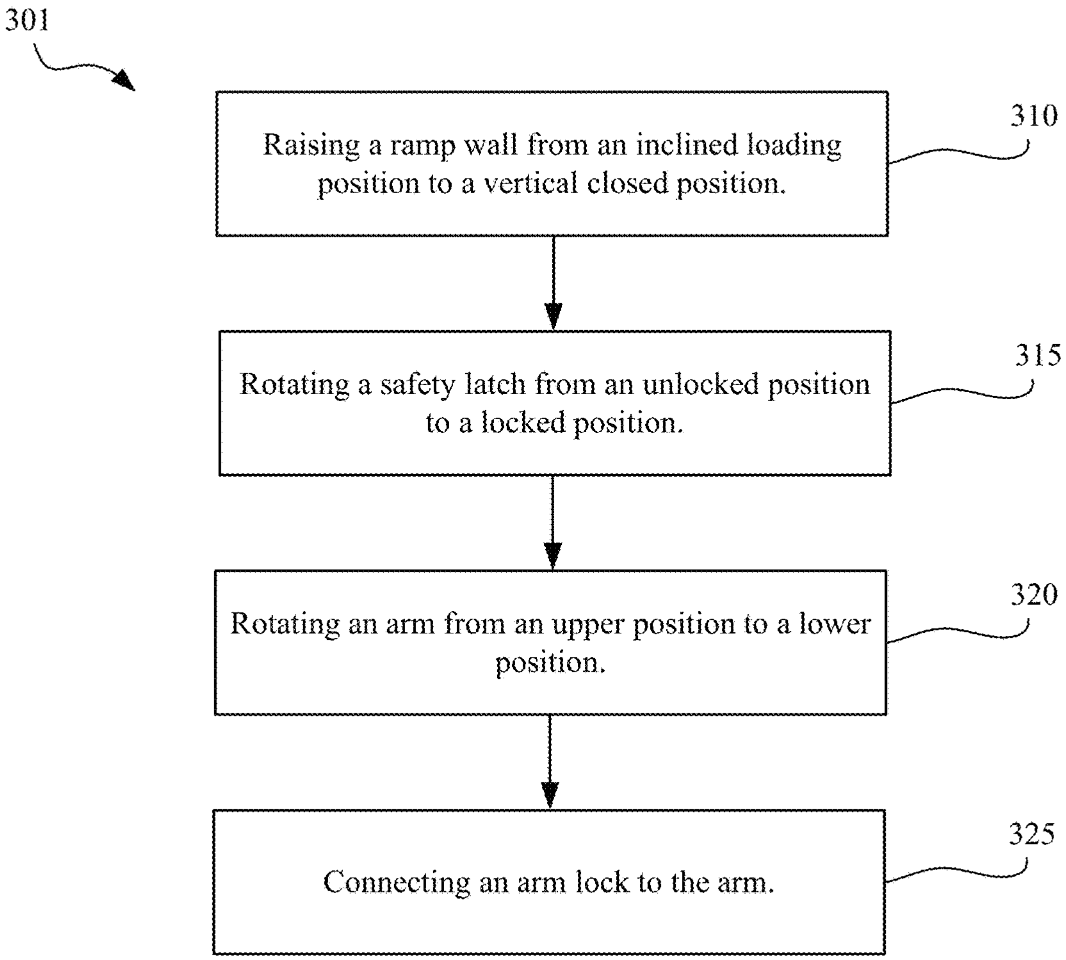
FIG. 10 is a flow chart of a method of closing an industrial container according to another embodiment of the present disclosure.

An embodiment of the present disclosure provides another method 301 of closing an industrial container. The method 301 may be performed following the method 201 of opening the industrial container. As shown in FIG. 10, the method 301 may comprise the following additional steps.

At step 315, the safety latch is rotated from the unlocked position to the locked position. Step 315 may be performed after step 310. By rotating the safety latch to the locked position, the ramp wall may be held in the vertical closed position to prevent accidental opening of the industrial container during the subsequent method steps.

At step 325, the arm lock is connected to the arm. Step 325 may be performed after step 320. The arm lock may be first disconnected from the arm before step 320. By connecting the arm lock to the arm, the arm may be fixed in the lower position, such that the arm is unable to rotate to prevent accidental disengagement of the one or more first locking latches and opening of the industrial container.

With the method 301 of the present disclosure, the arm lock and the safety latch may provide additional safety measures to the closing of the industrial container such that a single user can safely and easily raise and secure the ramp wall with reduced risk of injury from accidental opening.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. An industrial container, comprising:

a container body having a plurality of walls, the plurality of walls including a ramp wall;

a pivot assembly connecting the ramp wall with the container body for pivotal movement of the ramp wall, the pivot assembly including a pivot shaft;

a counter-balancing spring assembly including one or more springs arranged about the pivot shaft for biasing the ramp wall from a downwardly inclined loading position upwardly toward a vertical closed position with a torque force; and a locking assembly configured to lock the ramp wall in the vertical closed position;

wherein side walls of the container body include protruding upper portions extending outwardly from ends of the side walls which abut with the ramp wall in the inclined position.

2. The industrial container of claim 1, wherein the counter-balancing spring assembly comprises two torsion springs arranged concentrically about the pivot shaft.

3. The industrial container of claim 2, wherein the two torsion springs each include tangentially outwardly extending end portions which engage downwardly with a bottom wall of the container body and upwardly with the ramp wall.

4. The industrial container of claim 2, wherein the two torsion springs have a combined torque that is between 80% and 100% of a gravitational torque force generated by weight of the ramp wall.

5. The industrial container of claim 1, wherein the pivot shaft extends from one side edge of the ramp wall, through a bottom portion of the ramp wall, and through an opposite side edge of the ramp wall.

6. The industrial container of claim 1, wherein the container body further comprises a hook extending upwardly from a bottom wall of container body.

7. The industrial container of claim 6, wherein the hook is disposed at a height lower than the ramp wall, such that the hook does not interfere with the ramp wall in the loading position.

8. The industrial container of claim 6, wherein the hook is retractable from a raised position to a concealed position, such that the hook does not interfere with the ramp wall in the loading position when the hook is in the concealed position.

9. The industrial container of claim 1, wherein the protruding upper portions are angled relative to the ends of the side walls.

10. The industrial container of claim 1, wherein the protruding upper portions are curved relative to the ends of the side walls.

11. The industrial container of claim 1, wherein a side profile of the protruding upper portions corresponds to a side profile of the ramp wall.

12. The industrial container of claim 1, wherein the locking assembly comprises:

an arm pivotably connected to a first side wall of the container body;

a first link pivotably connected to the arm;

one or more first locking latches pivotably connected to the first side wall and pivotably connect to the first link, wherein the one or more first locking latches selectively engage with the ramp wall to lock the ramp wall in the inclined position; and a second link pivotably connected to the first link;

wherein rotation of the arm from a lower position to an upper position causes rotation of the one or more first locking latches to disengage with the ramp wall and unlock the ramp wall from the inclined position.

13. The industrial container of claim 12, wherein the locking assembly further comprises:

a locking shaft extending from the first side wall to a second side wall opposite to the first side wall, wherein the locking shaft is pivotably connected to the second link at a first end adjacent to the first side wall;

a third link pivotably connected to the locking shaft at a second end adjacent to the second side wall;

a fourth link pivotably connected to the third link; and one or more second locking latches pivotably connected to the second side wall and pivotably connected to the fourth link, wherein the one or more second locking latches selectively engage with the ramp wall to lock the ramp wall in the inclined position;

wherein rotation of the arm from the lower position to the upper position further causes rotation of the second link, locking shaft, third link, and one or more second locking latches to disengage with the ramp wall and unlock the ramp wall from the inclined position.

14. The industrial container of claim 12, wherein the locking assembly further comprises:

an arm lock connected to the first side wall and selectively connected to the arm which locks the arm in the lower position.

15. The industrial container of claim 12, wherein the locking assembly further comprises:

a safety latch pivotably connected to the first side wall which selectively engages with the ramp wall to lock the ramp wall in the inclined position.

16. A method of opening the industrial container of claim 1, the method comprising:

rotating an arm of the industrial container from a lower position to an upper position; and lowering the ramp wall from a vertical closed position to the inclined loading position;

wherein the locking assembly comprises:

a first link pivotably connected to the arm, wherein the arm is pivotably connected to a first side wall of the container body; and one or more first locking latches pivotably connected to the first side wall and pivotably connect to the first link, wherein the one or more first locking latches selectively engage with the ramp wall to lock the ramp wall in the inclined loading position;

wherein rotation of the arm from the lower position to the upper position causes rotation of the one or more first locking latches to disengage with the ramp wall and unlock the ramp wall from the inclined loading position.

17. The method of claim 16, wherein before rotating the arm from the lowered position to the upper position the method further comprises:

disconnecting an arm lock from the arm;

wherein the arm lock is connected to the first side wall and selectively connected to the arm to secure the arm in the lower position and the upper position.

18. The method of claim 16, wherein before lowering the ramp wall from the vertical closed position to the inclined loading position the method further comprises:

rotating a safety latch from a locked position to an unlocked position;

wherein the safety latch is pivotably connected to the first side wall and selectively engages with the ramp wall to lock the ramp wall in the inclined loading position.

19. The method of claim 16, further comprising closing the industrial container by:

raising the ramp wall from the inclined loading position to the vertical closed position; and rotating the arm from the upper position to the lower position;

wherein rotation of the arm from the upper position to the lower position causes rotation of the one or more first locking latches to engage with the ramp wall and lock the ramp wall in the inclined loading position.

20. An industrial container, comprising:

a container body having a plurality of walls, the plurality of walls including a ramp wall;

a pivot assembly connecting the ramp wall with the container body for pivotal movement of the ramp wall, the pivot assembly including a pivot shaft;

a counter-balancing spring assembly including one or more springs arranged about the pivot shaft for biasing the ramp wall from a downwardly inclined loading position upwardly toward a vertical closed position with a torque force; and a locking assembly configured to lock the ramp wall in the vertical closed position;

wherein side walls of the container body include protruding upper portions extending outwardly from ends of the side walls which abut with the ramp wall in the inclined position;

wherein the locking assembly comprises:

an arm pivotably connected to a first side wall of the container body;

a first link pivotably connected to the arm;

one or more first locking latches pivotably connected to the first side wall and pivotably connect to the first link, wherein the one or more first locking latches selectively engage with the ramp wall to lock the ramp wall in the inclined position; and a second link pivotably connected to the first link;

wherein rotation of the arm from a lower position to an upper position causes rotation of the one or more first locking latches to disengage with the ramp wall and unlock the ramp wall from the inclined position.

* * * * *